(12) United States Patent
Demaretz et al.

(10) Patent No.: US 11,569,582 B2
(45) Date of Patent: Jan. 31, 2023

(54) SLOT ANTENNA IN A RFID STORAGE

(71) Applicant: Stanley Black & Decker MEA FZE, Dubai (AE)

(72) Inventors: Thierry Demaretz, Grandpuits (FR); Nicolas Roger, la Neuville chant d'oisel (FR)

(73) Assignee: Stanley Black & Decker MEA FZE, Dubai (AE)

( * ) Notice: Subject to any disclaimer, the term of this patent is extended or adjusted under 35 U.S.C. 154(b) by 90 days.

(21) Appl. No.: 16/918,859

(22) Filed: Jul. 1, 2020

(65) Prior Publication Data
US 2021/0005971 A1  Jan. 7, 2021

(30) Foreign Application Priority Data
Jul. 2, 2019  (EP) ..................................... 19183756

(51) Int. Cl.
*H01Q 13/10* (2006.01)
*B25H 3/02* (2006.01)
*H01Q 1/22* (2006.01)

(52) U.S. Cl.
CPC ............. *H01Q 13/10* (2013.01); *B25H 3/028* (2013.01); *H01Q 1/2216* (2013.01)

(58) Field of Classification Search
CPC .. B25H 3/028; G06K 7/10415; H01Q 1/2216; H01Q 13/10; G06Q 10/087
See application file for complete search history.

(56) References Cited

U.S. PATENT DOCUMENTS

| | | | |
|---|---|---|---|
| 2005/0110638 A1* | 5/2005 | Mohr | B25H 3/00 340/568.1 |
| 2006/0186995 A1* | 8/2006 | Wu | G06K 7/0008 340/572.1 |
| 2006/0232413 A1 | 10/2006 | Lam et al. | |
| 2007/0108273 A1* | 5/2007 | Harper | G07F 9/10 235/382 |
| 2007/0115127 A1* | 5/2007 | Harper | G06Q 10/087 340/572.1 |
| 2007/0279286 A1 | 12/2007 | Coutts et al. | |
| 2008/0165013 A1* | 7/2008 | Harper | G06Q 10/087 340/572.8 |
| 2008/0223930 A1* | 9/2008 | Rolland | G06Q 10/087 235/385 |
| 2009/0051246 A1* | 2/2009 | Mueller | H01L 41/053 310/313 R |

(Continued)

FOREIGN PATENT DOCUMENTS

| | | |
|---|---|---|
| WO | 0016280 A1 | 3/2000 |
| WO | 2007140800 A1 | 12/2007 |

(Continued)

OTHER PUBLICATIONS

Extended European Search Report for EP Application No. 19183756.6 dated Jan. 3, 2020, 7 pages.

*Primary Examiner* — Thien M Le
(74) *Attorney, Agent, or Firm* — Caeden C. Drayton

(57) ABSTRACT

In a system or device for identifying or tracking tools, the device comprising: a metallic wall delimiting an area wherein a first tool including an RFID tag can be placed, an antenna for communicating with the RFID tag whenever the first tool is in the first area, wherein the antenna is a slot antenna cut out in the metallic wall.

17 Claims, 7 Drawing Sheets

(56) References Cited

U.S. PATENT DOCUMENTS

| | | | |
|---|---|---|---|
| 2010/0039682 A1* | 2/2010 | Peot | H04N 1/00827 358/474 |
| 2014/0138440 A1 | 5/2014 | D'Ambrosio et al. | |
| 2015/0220764 A1* | 8/2015 | Pudenz | H01Q 1/2216 235/385 |

FOREIGN PATENT DOCUMENTS

| | | | |
|---|---|---|---|
| WO | 2015056048 A1 | 4/2015 | |
| WO | 2017141164 A1 | 8/2017 | |

* cited by examiner

FIG. 2
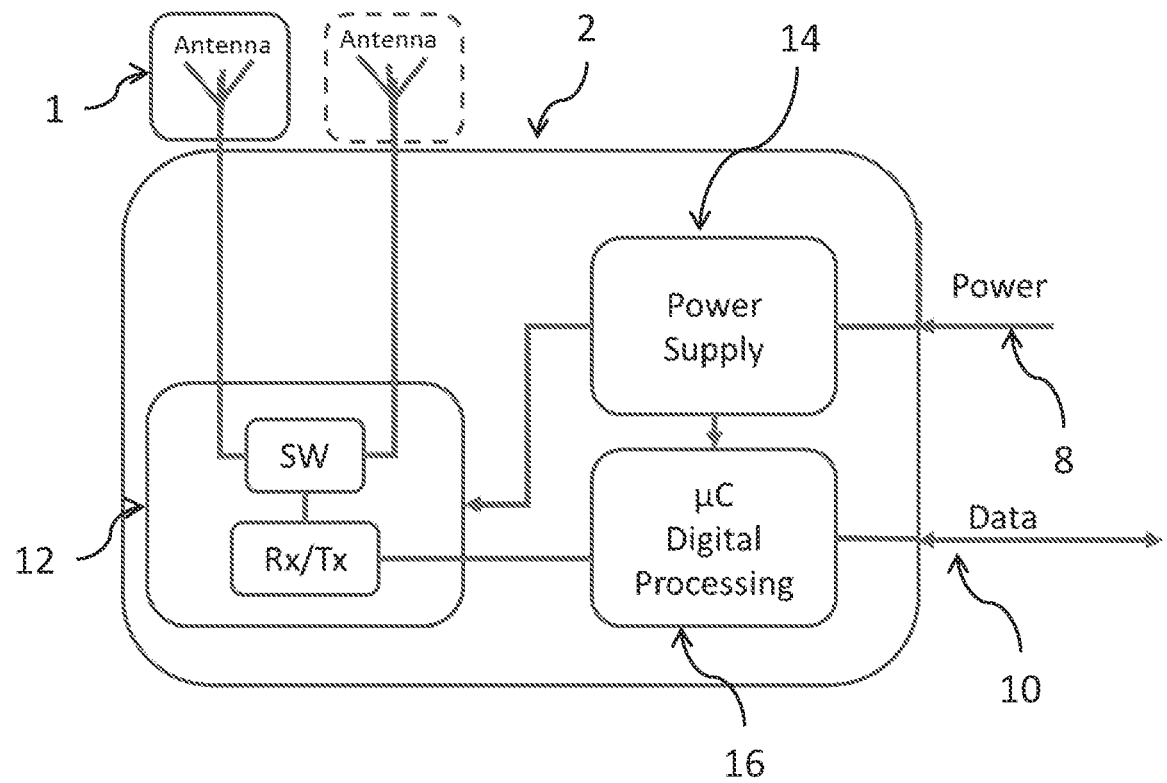
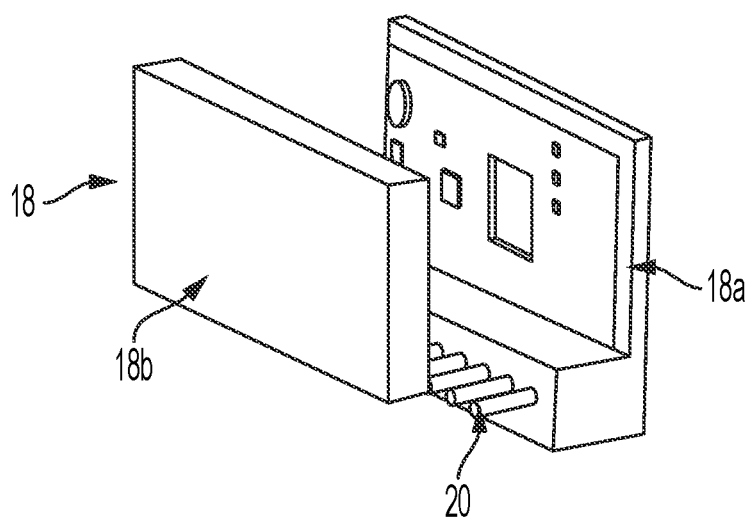
FIG. 3

SLOT ANTENNA IN A RFID STORAGE

This patent application claims priority to EP19183756.6, filed Jul. 2, 2019, which is hereby incorporated by reference in its entirety.

FIELD OF THE INVENTION

The invention deals with a device for identifying or tracking tools.

STATE OF THE ART

It has been proposed a cabinet comprising a system for tracking or identifying a tool equipped with RFID tag. The RFID tag is a passive element (in the sense a tool equipped with a RFID tag does not comprise any internal power supply for supplying the RFID tag with power). The system comprises two antennas for communicating with the RFID tag of any tool secured in the cabinet: a first antenna arranged at the top of the cabinet, and a second antenna arranged at the bottom of the cabinet.

To check if tools are secured in the cabinet or not, an antenna of the system emits a request radio signal. A RFID tag of a tool located next to one of the antennas receives a request radio signal, and emits a response radio signal carrying information about the tool. This response signal is acquired by the antenna. The system can then extract said information to identify the tool that emitted the response.

However, the system can fail to detect that a tool is secured in the cabinet when the response signal emitted by the RFID tag of said tool then received by an antenna is too weak.

The quality of the response signal acquired by the antenna actually depends of the settings used by the antenna which emitted the request radio signal (especially the power and the frequency used by the antenna to send the request radio signal).

The quality of the response signal acquired by the antenna also depends on the environment of the tool when the tool is actually present in the cabinet. Some obstacles located between the tool and the antenna may hinder the propagation of the response radio signal. Metallic walls defining a cavity wherein the tool is placed may also hinder this propagation.

To avoid missed detections, the power used by the antenna to emit the request radio signal could be increased. However, this solution is energy consuming.

SUMMARY OF THE INVENTION

An object of the present invention is a system for tracking or identifying a tool which is less subject to missed detection without requiring a higher amount of energy. To that end a device according to a first aspect is defined in claim 1.

Basically, a metallic wall is a hostile environment prone to RF disruption. Defining a slot in such a metallic wall to obtain a slot antenna actually converts this hostile environment into an environment wherein a response signal emitted by the RFID tag of a tool placed in the area is more efficiently detected. This efficiency gain is obtained without increasing the power level used by the antenna. Moreover, a slot antenna easier to manufacture and cheaper than a standalone antenna. Optional features of the device according to the first aspect are recited in the dependent claims.

Another object of the present invention is to reduce the amount of power needed for detecting the presence of a tool in a predetermined area. To that end a device for identifying or tracking tools according to a this aspect is proposed. The devices comprises: a first wall delimiting a first area wherein a first tool including an RFID tag can be placed, a first antenna for communicating with the RFID tag whenever the first tool is in the first area, including sending a request signal to the RFID tag and receiving a response signal emitted by the RFID tag in response to the request signal, a first control unit configured to set the first antenna with a first frequency and a first power to values fulfilling the following criteria:

a. the first frequency is selected in a predetermined range of RFID frequencies and maximizes the power of the response signal, b. the first power is a minimum value enabling the first antenna set with the selected first frequency value to effectively detect the response signal such that an information about the first tool can be extracted therefrom.

The device may further comprise the following optional features taken alone or combined together, when such combination is technically feasible.

In another embodiment of the present invention, the first control unit may be configured to perform the following steps: at a first time at which the first tool is in the first area, determining the first frequency value and the first power value by testing different values in the predetermined range of RFID frequencies and different values in a power range, at a second time after the first time, setting the first antenna with the first frequency value and the first power value determined at the first time, attempting to extract the information about the first tool from the first radio signal, and repeating the determination step only if the attempt fails.

Additionally, the number of different frequency values tested when repeating the determination step at the second time may be smaller than the number of different frequency values tested at the first time, and/or the number of different power values tested when repeating the determination step at the second time may be smaller than the number of different power values tested at the first time.

The device may further comprise: a first analog-to-digital converter (ADC) for converting an analog signal acquired by the first antenna into a first digital signal, a first processing unit for processing the digital signal, a digital link for transmitting the digital signal to the first processing unit.

In other embodiment, the first wall and/or the first ADC may be mobile relative to the first processing unit. In some preferred embodiments, the first ADC can be put into: a first position relative to the first processing unit, wherein the first ADC is connected to the digital link to allow the digital signal to be transmitted to the first processing unit, and a second position relative to the first processing unit, wherein the first ADC is disconnected from the digital link to prevent a transmission of the digital signal to the first processing unit.

The device may also further comprise a first drawer comprising the first wall, the first wall being for instance a bottom wall of the first drawer on which the first tool can rest. The first position may be a closed position of the first drawer and the second position may be an opened position of the drawer. The first analog-to-digital converter (ADC) may be affixed to the first drawer, for instance to a back of the drawer. The first wall may be metallic and the first antenna may be a slot antenna cut out in the first wall.

The device aspect may also further comprise: a second wall delimiting a second area wherein a second tool including a RFID tag can be placed while the first tool is placed in the first area, a second antenna for communicating with the RFID tag of the second tool whenever the second tool is in the second area, a second control unit configured to set the second antenna with a second frequency value and a second power value fulfilling the following criteria:

a. the second frequency value is selected in a predetermined range of RFID frequencies and maximizes the power of a response signal emitted by the RFID tag of the second tool in response to a request signal emitted by the second antenna, b. the second power value is a minimum value enabling the second antenna set with the selected frequency value to effectively detect the response signal such that an information about the second tool can be extracted therefrom.

In other embodiments, the second control unit may be configured to perform the following steps: at a third time at which the second tool is in the second area, determining the second frequency value and the second power value by testing different values in the predetermined range of RFID frequencies and different power values, at a fourth time after the third time, setting the second antenna with the second frequency value and the second power value determined at the third time, attempting to extract the information about the second tool from the second radio signal, and repeating the determination step only if the attempt fails. The number of different frequency values tested when repeating the determination step at the fourth time may be smaller than the number of different frequency values tested at the third time, and/or the number of different power values tested when repeating the determination step at the fourth time may be smaller than the number of different power values tested at the third time. The first control unit and the second control unit may be a same control unit.

The device may also further comprise: a second analog-to-digital converter (ADC) for converting an analog signal acquired by the second antenna into a second digital signal, a second processing unit for processing the second digital signal, a second digital link for transmitting the digital signal to the second processing unit. The second wall and/or the second ADC may be mobile relative to the second processing unit. Preferably, the second ADC can be put into: a third position relative to the second processing unit, wherein the second ADC is connected to the second digital link to allow the second digital signal to be transmitted to the second processing unit, and a fourth position relative to the second processing unit, wherein the second ADC is disconnected from the second digital link to prevent a transmission of the second digital signal to the second processing unit.

The device may also further comprise a second drawer comprising the second wall, wherein the second drawer is different from the first drawer, the second wall being for instance a bottom wall of the second drawer on which the second tool can rest. The second wall may be metallic and the second antenna may be a slot antenna cut out in the second wall.

A roller cabinet may comprise the device for identifying or tracking tools according to the another aspect of the present invention.

The terminology used herein is for the purpose of describing implementations or embodiments only and is not intended to be limiting of the invention. As used herein, the singular forms, "a", "an" and "the" are intended to include the plural forms as well, unless the context clearly indicates otherwise. It will be further understood that the root terms "can", "include", "can include", "may", and/or "have", when used in this specification, specify the presence of stated features, steps, operations, elements, and/or components, but do not preclude the presence or addition of at least one other feature, step, operation, element, component, and/or groups thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

For definitional purposes and as used herein "connected", "coupled" or "attached" includes operation or physical, whether direct or indirect, affixed or coupled. Thus, unless specified, "connected", "coupled" or "attached" is intended to embrace any operationally functional connection.

As used herein "substantially," "generally," "slightly" and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic.

The details of one or more implementations are set forth in the accompanying drawings and the description below. Other features will be apparent from the description and drawings, and from the claims.

BRIEF DESCRIPTION OF THE DRAWINGS

The above-mentioned and other features and advantages of this invention, and the manner of attaining them, will become more apparent and the invention will be better understood by reference to the following descriptions of embodiments of the invention taken in conjunction with the accompanying drawings:

FIG. 2 is a schematic representation of a slave module of the system of FIG. 1, according to an embodiment of the invention.

FIG. 3 is a perspective view of of the slave module of FIG. 2, according to an embodiment of the invention.

Corresponding reference characters indicate corresponding parts throughout the several views. The exemplifications set out herein illustrate embodiments of the present invention, and such exemplifications are not to be construed as limiting the scope of the present invention in any manner.

DETAILED DESCRIPTION

An example implementation of the present invention is shown in FIGS. 1-7. The example device illustrated in FIGS. 1-7 is a a system for identifying or tracking tool, simply for ease of discussion and illustration. However, the principles to be described herein may be applied to other types of systems or devices that are operable in different modes.

1/ System for Identifying or Tracking Tools

Figure 1:
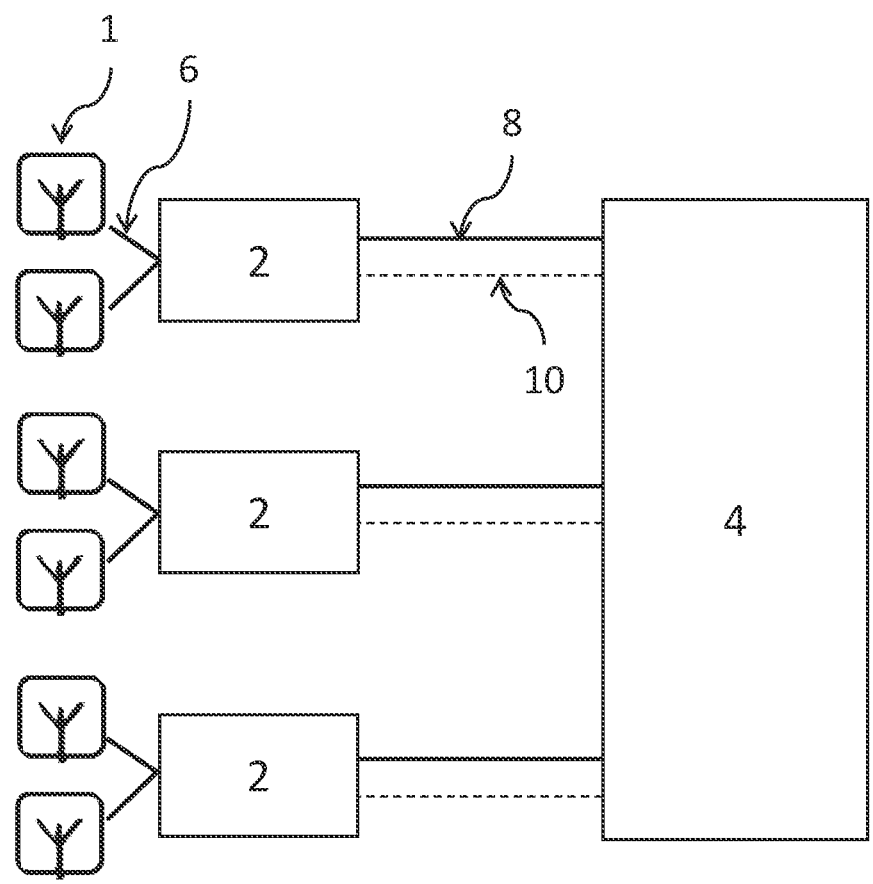
FIG. 1 is a schematic representation of a system for identifying or tracking tool according to an embodiment of the invention.

Referring to FIG. 1, a system for identifying or tracking tools equipped with RFID tags comprises a plurality of antennas 1 for communicating with RFID tags, a plurality of slave modules 2, and a master module 4.

Each antenna 1 is configured to communicate with RFID tags. Each antenna can send a request radio signal to a RFID tag and receive a response radio signal emitted by an RFID tag.

Each slave module 2 (called RF head hereinafter) is connected with at least antenna 1 by means of an analog link 6, such as a coaxial cable. A slave module can be connected with a single antenna 1 or with many antennas 1 using at least one analog link 6.

The master module 4 is connected with each RF head 2 by means of at least one power link 8 and at least one data link 10.

Each power link 8 is configured to supply an RF head 2 with power.

Each data link 10 is a digital link configured to transmit digital signals from an RF head 2 to the master module 4 and digital signals from the master module 4 to at least one RF head 2.

Referring to FIG. 2, a RF head 2 comprises an interface 12 for communicating with at least one antenna, a power supply unit 14 and a converter unit 16.

The interface 12 is connected to at least antenna 1 by means of an analog link 6.

The power supply 14 is connected with the master module 4 via a power link 8. When the power supply 14 unit receives power through the power link 8, it provides power to all other electronic components of the RF head 2 and to each antenna 1 connected to the RF head 2 via the interface 12.

The convertor unit 16 is connected with the master module 4 by means of at least one data link.

The convertor unit 16 comprises an analog-to-digital converter (ADC). The ADC is configured to convert an analog signal acquired by an antenna and received by the interface into a digital signal, and to transmit this digital signal to the master module 4 via a digital link 10.

The convertor unit 16 may also comprise a digital-to-analog convertor (DAC). The DAC is configured to convert a digital signal coming from a data link 10 into an analog signal, and transmit this analog signal to the interface 12 such that said interface 12 can then transmit this analog signal to an antenna 1.

Referring to FIG. 3, the RF head 2 comprises a housing 18 containing all the electronic components 12, 14, 16 discussed above. These electronic components are typically included in a common circuit as shown in FIG. 3.

The housing 18 may comprise two parts: a base 18*a* and a cover 18*b* which can be affixed to each other to close the housing 18.

The housing 18 comprises as well a plurality of ports 20, each port 20 being designed to be connected with a power link 8 and a data link 10.

Figure 4:
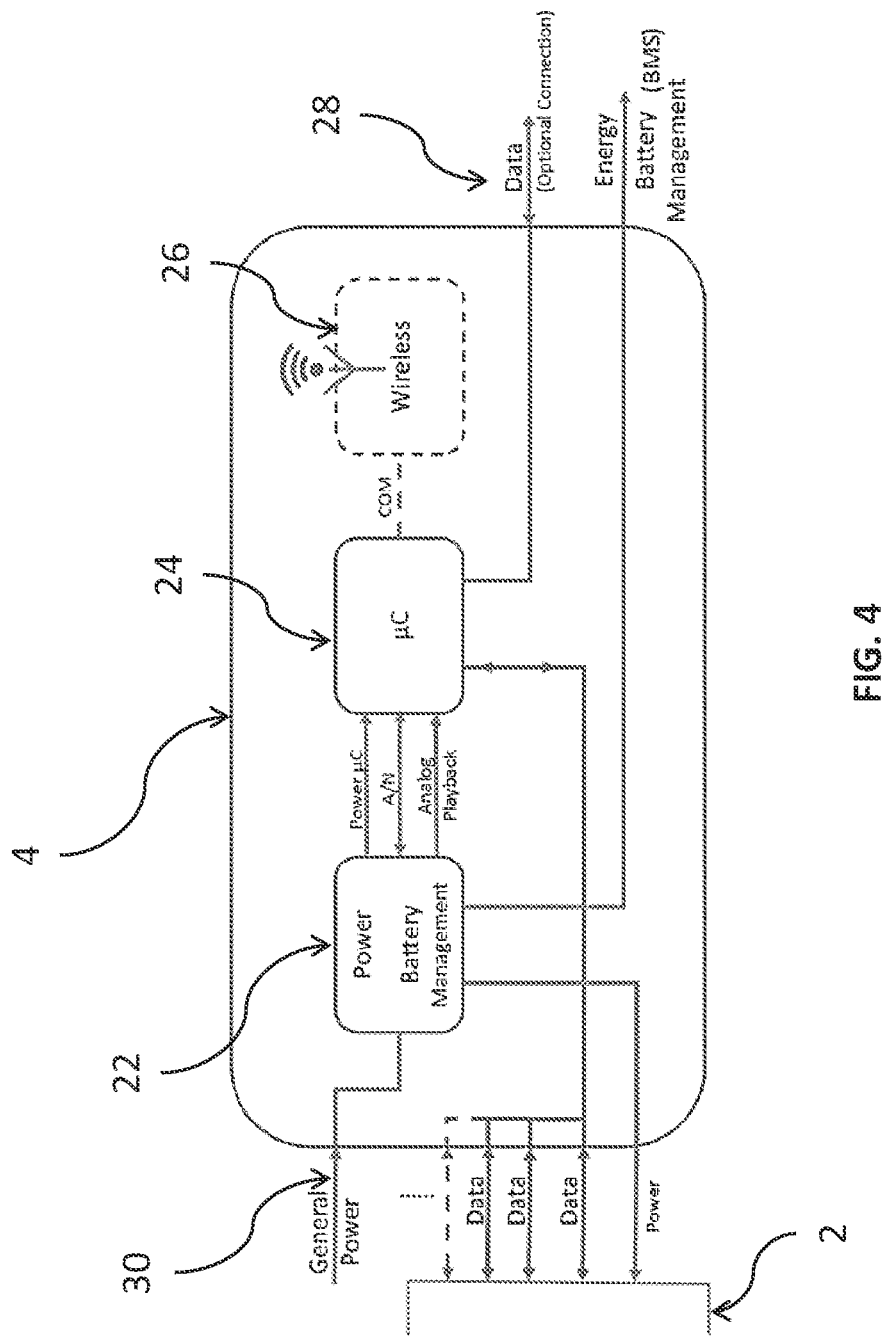
FIG. 4 is a schematic representation of a master module 4 of the system of FIG. 1, according to an embodiment of the invention.

Now turning on FIG. 4, the master module 4 comprises a power management unit 22, a processing unit 24 and means 26, 28 for accessing a tool database.

The tool database is not stored in the master module 4 but is rather stored in a memory of a server external to the roller cabinet. The means for accessing the tool database may comprise a communication interface for accessing this external database, for example a wireless communication interface 26 (Wi-Fi, Bluetooth, etc) and/or a wired communication interface 28.

Alternatively, the means for accessing the tool database comprises a memory included in the master module 4*n* the tool database being stored in this memory. This memory may be of any type: HDD, SSD, flash, and so on.

The power management unit 22 is configured to supply power to: the RF heads 2 by means of the power links 8, and to other electrical components 24, 26 of master module 4. The power management unit 22 may comprise a battery for supplying power and/or may be connected with an external power source by means of a general power link 30.

The processing unit 24 is connected to the data links. It is configured to process digital signals transmitted by data links.

Generally speaking, the system comprises a comprises a control unit configured to set each antenna with a frequency and a power. The control unit is for instance the power management unit 22 alone or is the combination of the power management unit 22 and of the processing unit 24. The control unit can assign different power/frequencies to different antennas 1.

The tool database comprises multiple entries, each entry comprising a tool identifier possibly in association with other information related to a tool.

All electronic components of the master module 4 depicted in FIG. 4 can typically be integrated in a common circuit of motherboard type.

2/ Roller Cabinet Comprising a System for Identifying or Tracking Tools

Figure 5:
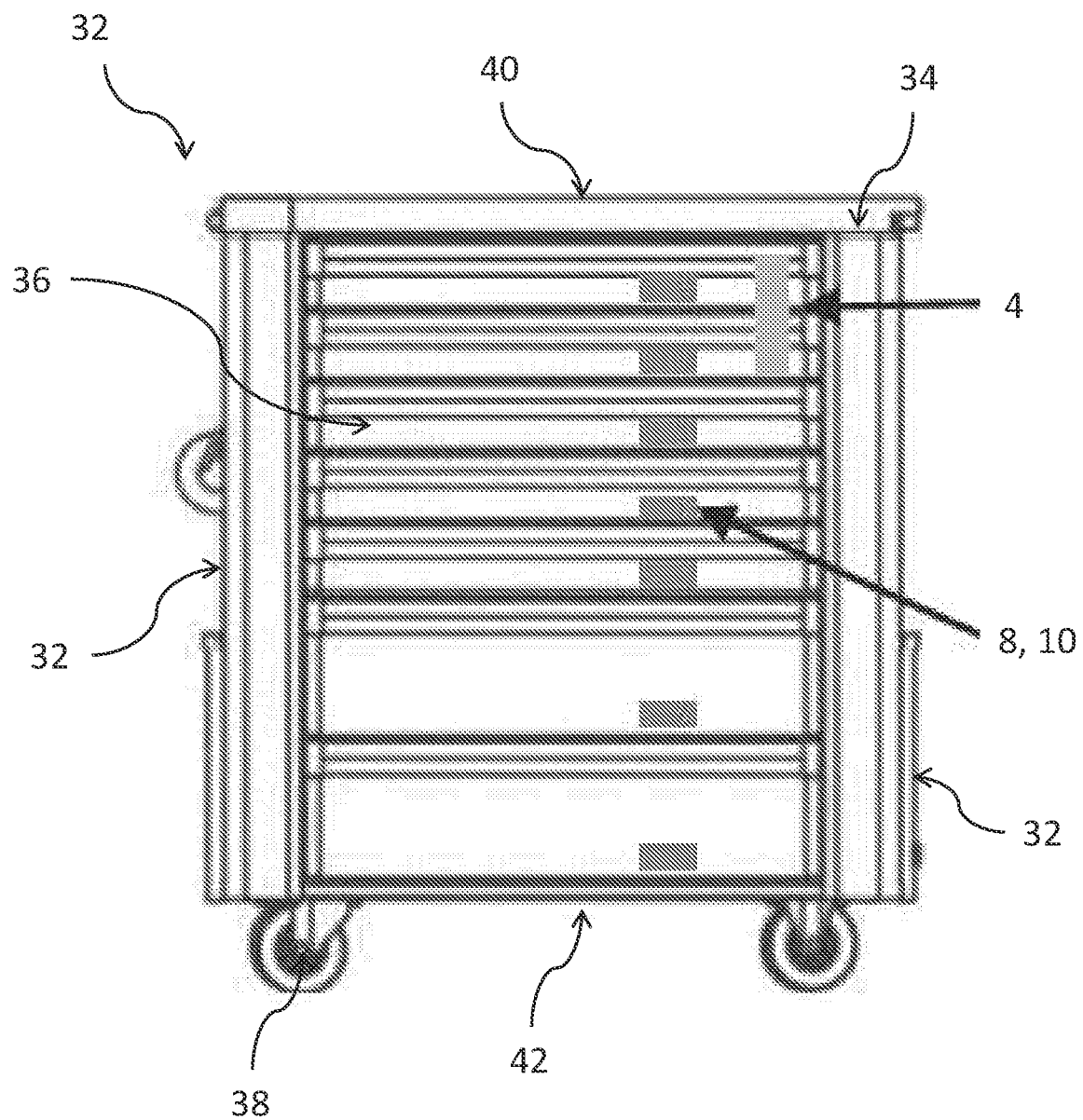
FIG. 5 is a side view of a roller cabinet according to an embodiment of the invention.
Figure 6:
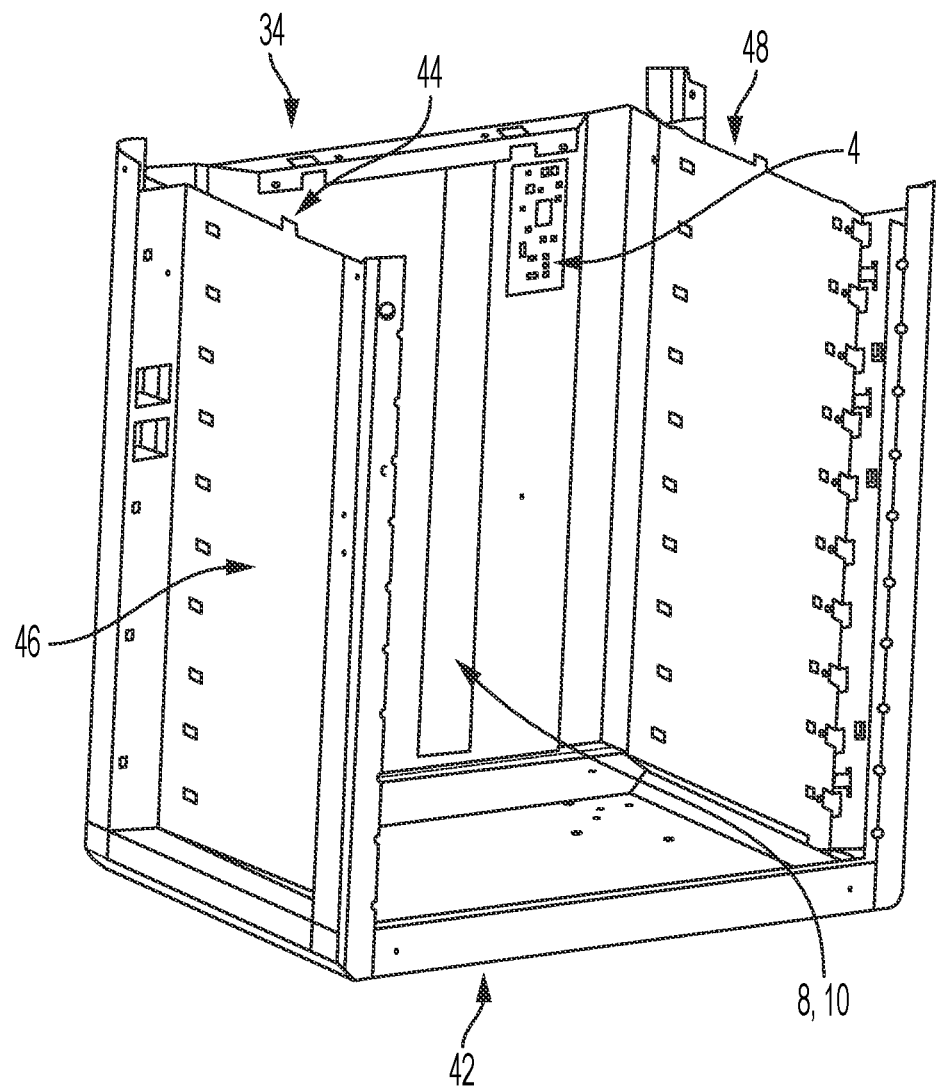
FIG. 6 is a perspective view of a casing of a roller cabinet, according to an embodiment of the invention.

Referring to FIGS. 5 and 6, a roller cabinet 32 for storing tools includes the system for tracking or identifying tools described above.

The roller cabinet 32 comprises a casing 34 and a plurality of drawers 36. The plurality of drawers may comprise at least three drawers, for instance seven drawers as depicted in FIG. 5.

The roller cabinet 32 further comprises wheels 38 mounted on the casing 34, for moving the roller cabinet.

As shown in FIG. 6, the casing 34 defines an internal cavity of the roller cabinet 32.

The casing 34 comprises a top wall 40, a bottom wall 42, a back wall 44, and two side walls 46, 48.

The cavity is defined between the two side walls 46, 48 and is defined between the top wall 40 and the bottom wall 42.

The master module 4 is affixed to the casing. In the embodiment depicted in FIG. 6, the master module 4 is affixed to an inner surface of the back wall 44.

The power links 8 and the digital links 10 are affixed as well on the inner surface of the back wall 44. The links 8, 10 extend parallel to each other and vertically in the cavity defined by the casing 34.

The drawers 36 are stacked vertically in the cavity defined by the casing 34.

Each drawer 36 is mobile relative to the casing 34. More precisely, each drawer 36 is arranged in the cavity so as to slide relative to the casing 34 between a closed position and an opened position wherein the drawer is entirely covered by the top wall 40.

Figure 7:
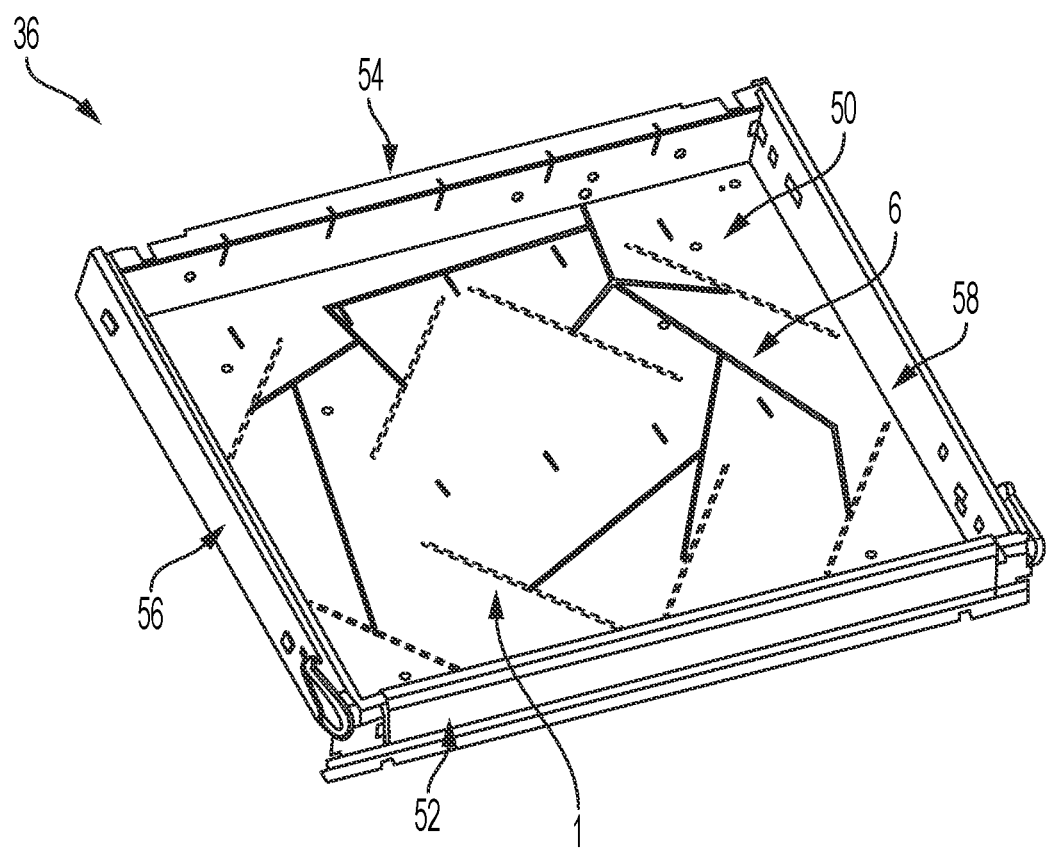
FIGS. 7 and 8 are two different perspective view of a drawer of a roller cabinet, according to an embodiment of the invention.
Figure 8:
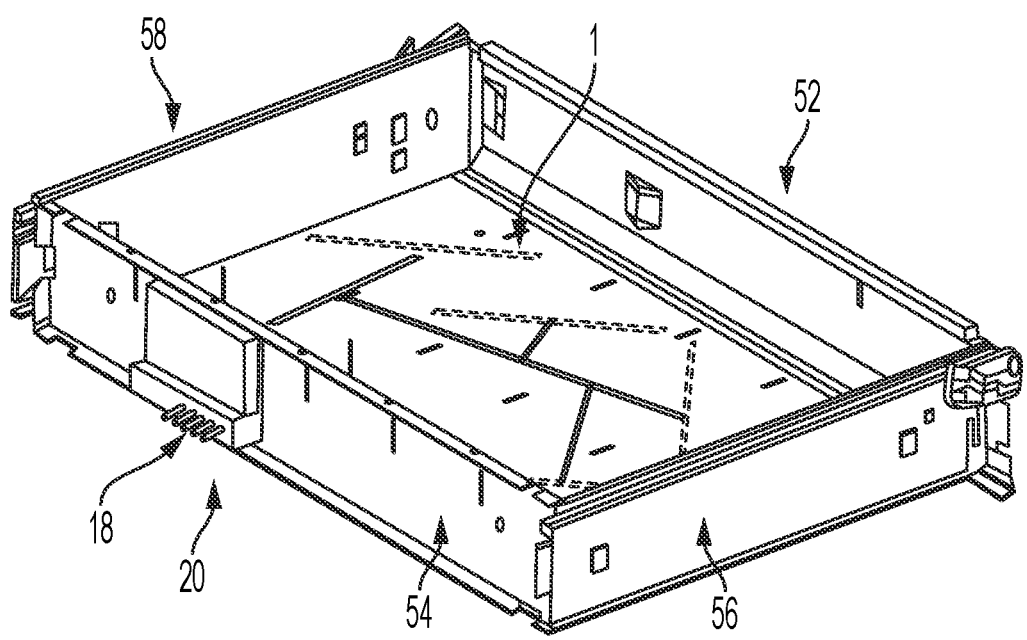

As shown in FIGS. 7 and 8, a drawer 36 comprises a bottom wall 50 extending horizontally, and the following walls extending vertically and connected to the bottom wall: a front wall 52, a back wall 54, and two side walls 56, 58.

The drawer 36 defines an area wherein tools can be placed whenever the drawer 36 is in the opened position. When the first drawer is in its closed position, any tool placed therein is secured in the roller cabinet 32.

This area is defined between the front wall 52 and the back wall 54, and is defined between both side walls 56, 58. Each of walls 50, 52, 54, 56, 58 delimits this area.

Tools placed in the area rest on the bottom wall 50.

The bottom wall comprises an upper surface and a lower surface opposite to the upper surface. It is rectangular.

At least one antenna 1 of the system is a slot antenna cut out in a metallic wall delimiting the area wherein tool can be placed.

Such arrangement is advantageous for many reasons: first, communications between the first (slot) antenna and an RFID tag of a tool placed in the first area defined in the first drawer is particularly efficient; second, there is no need to include a standalone antenna in the system, which is expensive.

In the embodiment depicted in FIGS. 7 and 8 the metallic wall wherein at least one slot antenna 1 is cut out is the bottom wall 50.

A slot antenna 1 comprises at least one slot opening in two opposite surfaces of the metallic wall (for instance the upper surface and the lower surface of the bottom wall).

The dimensions of the slot (length, width) of an antenna 1 define a range of RFID frequencies which can be used by the slot antenna for radio communications with a RFID tag of a tool.

More than one slot antenna 1 can be cut out in the metallic wall. In the embodiment depicted in FIGS. 7 and 8, eight slot antennas 1 are cut out in the bottom wall 50 of a drawer 36. A slot may extend diagonally with respect to the back wall and to the side walls.

Besides, a RF head 2 of the system is affixed to the drawer 36.

The analog links 6 linking the antennas 1 of a drawer 36 to the RF head 2 affixed to the same drawer 36 extend on the lower surface of the bottom wall 50 of the drawer 36.

Coaxial cable are prone to generate interferences in radio signals. Having an RF head 2 affixed to a drawer 36 is advantageous in that the analog link can be short. Therefore, potential interferences generated by such analog links 6 is limited.

More precisely, a RF head 2 is affixed to the back wall 54 of a drawer 36, such that the ports 20 of the RF head 2 face the back wall 44 of the casing 34.

When the drawer 36 is in its closed position, the ports 20 of the RF head contact the data/power links 8, 10. In other words, in the closed position, data can be exchanged between the RF head 2 and the master module 4 using at least one digital link 10, and the master module 4 can supply the RF head with power using a power link 8.

When the drawer 36 is opened, ports 20 are disconnected from the data/power links 8, 10. In other words, in the closed position, data cannot be exchanged between the RF head and the master module 4 and the master module 4 does not supply the RF head with power.

Each drawer 36 of the roller cabinet 32 comprises a RF head 2 and at least one antenna 1 according to the arrangement depicted in FIGS. 7 and 8. For instance, FIG. 5 shows an embodiment wherein the roller cabinet 32 comprises seven drawers 26 and seven RF heads 2, each RF head 2 being affixed to a respective drawer 36.

3/ Method for Identifying or Tracking a Tool Comprising an RFID Tag

Let M be a number of predetermined tools that are to be secured in the roller cabinet.

Each tool can be of any type: screwdriver, hammer, pliers, etc.

Each tool comprises a RFID tag. The RFID tag comprises a memory storing information about the tool, including the tool identifier. The RFID tag is able to communicate with any antenna 1 of the system. The RFID tag is passive in the sense is does not comprise any internal power supply.

Each of the tools is supposed to fit in one of the drawers, for instance only one of the drawers. Preferably, at least one 36 (or each) drawer 36 of the roller cabinet contains a tool organizer. Each tool organizer defines at least one cavity for receiving one of the M tools. Each cavity is shaped so as to be complementary with the shape of one of the M tools.

In a preliminary step, the M tools are registered in the database. For each tool, is created in the database a tool entry comprising at least:

a unique identifier of the tool, a unique identifier of the drawer this tool fits in, a unique identifier of an optimal antenna 1 to be used to communicate with the tool when the tool is placed in the reference drawer (how this optimal antenna is determined will be described later). It is to be noted that the optimal antenna is not necessarily part of the drawer the tool fits in; rather, this optimal antenna may be part of another drawer of the roller cabinet.

a predetermined frequency value, and a predetermined power value.

The configuration of each drawer 36 may also be registered in the database. For instance, is created for each drawer 36 a drawer entry comprising: the unique identifier of the drawer, and the unique identifier of each antenna 1 included in the drawer.

By convention, data within an entry of the database are said to be associated with each other.

To check if any of the M tools is present or not in the roller cabinet, the system performs the following steps.

The processing unit detects a drawer has reached its closed position (this drawer is referred to as the "reference drawer" hereinafter). For instance, this detection comprises detecting a first period of time wherein no signal is received from the RF head 2 of the reference drawer 36 (this means that said RF head 2 is disconnected from the master module) then detecting a second period of time wherein a signal from the RF head 2 of the reference drawer 36 is received by the processing unit (which means this RF head 2 head has just been reconnected to the master module).

Upon detecting the reference drawer 36 is closed, the processing unit determines all the tools that fit in the reference drawer which has just been closed. To do so, the processing unit accesses the database and search for tool entries containing the unique identifier of the reference drawer 36.

For each tool fitting in the reference drawer, the processing units performs the following sub-steps.

The processing units determines an antenna 1 to use to communication with this tool. To do so, the processing unit accesses the database and reads the unique identifiers of the optimum antenna 1 associated with said tool in a tool entry.

As said before, this optimum antenna 1 is not necessarily part of the reference drawer itself. Thus, the processing unit then determines the drawer 36 comprising the optimum antenna 1 associated with the tool. To do so, the processing unit parses the drawer entries registered in the database.

Then, the control unit of the master module 4 supplies the optimum antenna 1 with an amount of power that corresponds to the power value associated with the optimal antenna 1 in the database. To do so, the control unit sends a power to the RF head 2 of the drawer 36 including the optimum antenna 1 via a power link 8. In turn, this RF head 2 supplies the optimum antenna 1 with power.

Moreover, the control unit sets the optimum antenna 1 with the predetermined frequency associated with the optimum antenna 1 in the database.

The optimum antenna 1 sends a request radio signal and waits for a response signal.

If the tool the optimum antenna 1 is supposed to communicate with is actually present in the reference drawer 36, the RFID tag of said tool receives the request signal and emits a response radio signal in response to the request signal, said response signal carrying information about the tool, including the unique identifier of the tool. Then, the optimum antenna 1 receives this response signal, converts it into an analog signal, transmits the analog signal to the RF head 2 via an analog link 6. The ADC included in the RF head 2 converts the analog signal into a digital signal, then the digital signal is transmitted to the master module via a digital link. The processing unit extracts the unique identifier of the tool from the digital signal. Then the processing unit accesses the database and compares the unique identified extracted and the tool identifier associated with the optimum antenna in the database. If both tool identifier match, the processing unit 24 generates a message indicating that the tool is present in the roller cabinet 32, or more specifically in the reference drawer 36.

If the optimum antenna 1 does not receive any response signal and/or if the tool identifiers compared by the processing unit mismatch, the processing unit 24 generates a message indicating that the tool is not present in the roller cabinet 32, or more specifically not present in the reference drawer 36.

Any message generated by the processing unit can be sent to a user terminal comprising a display screen, such that said message is displayed on the display screen.

The steps above are repeated for each tool fitting in the reference drawer 36.

4/ Adaptive Frequency and Power

Basically, any antenna 1 of the system may communicate with the RFID tag of a tool placed in a drawer 36 using different frequency values and different power values. the RFID tag of any tool is a passive element. The power of a response signal emitted by an RFID tag depends on the power used by the antenna to send the request signal.

Information may not be properly extracted from a response signal acquired by an antenna 1, if this antenna has been set with a very low power and/or an inappropriate frequency.

Besides, setting an antenna of the system with a very high power is energy consuming.

It is also to be noted that all RFID frequencies an antenna 1 can use to communicate with an RFID tag are not equally efficient. Indeed, the power required by an antenna 1 to allow a proper extraction of information carried by a response signal depends on the frequency used by said antenna 1 to send the request signal.

In addition, multiple antennas 1 configured to user the same power and the same frequency are not equally efficient to communicate with a tool placed in a drawer 36, because the antennas have different locations. An antenna 1 very close to a tool tends to communicate much more efficiently than another antenna located far from said tool.

As indicated upwards, when a reference drawer is closed, the system attempts to communicate with each tool fitting in the reference drawer by means of associated optimum antennas 1 and associated power/frequency values stored in the database. These optimum antennas 1 and the power/frequency parameter they use are determined in a preliminary calibration step which comprises the following sub-steps.

The M tools are all placed in their respective reference drawers 36, and all the drawers 36 are closed.

The system determines a frequency value Fij and a first power value Pij to be used by the i-th antenna of the system for communicating with the j-th tool secured in the roller cabinet 32, wherein the frequency value Fij and the power value Pij fulfil the following criteria:

the frequency value Fij is selected in the predetermined range of RFID frequencies that the antenna can use, and F maximizes the power of a response signal emitted by the RFID tag of the tool in response to a request signal emitted by the antenna.

the power value Pij is a minimum value enabling the antenna configured with the selected frequency value to effectively detect the response signal such that information about the tool can be extracted therefrom.

The control unit tests different frequency values and different frequency values to determined Fij, Pij.

The control unit may for instance set the i-th antenna with a lowest frequency of the RFID frequency range, and a very low power. At this point, no information can be extracted from a response signal acquired by the i-th antenna then be processed by the processing unit because the power set is too low. The control unit gradually increases the power value used by the i-th antenna. At some point, the power set in the i-th antenna becomes high enough to allow extracting data from a response signal acquired by the i-th antenna. Alternatively, the control unit may set the i-th antenna with a high power, then gradually decrease the power value used by the i-th antenna. At some point, the power set in the i-th antenna becomes too small to allow extracting properly information from a response signal acquired by the i-th antenna.

The minimum power that allow such extraction is stored in the memory in association with the frequency. The control unit repeats the steps above for frequencies values included the RFID frequency range. As a result, as many minimum powers are stored in the memory, each minimum power being associated with a frequency. The control unit selects as power Pij the minimum of the minimum power values stored so far in the memory, and selects as frequency Fij the frequency associated with said minimum.

The determination step is repeated for every antenna (for i from 1 to N) and for every tool (for j from 1 to M). In other words, the determination step is performed NM times.

At this stage, each tool j is associated with N pairs of parameters (Pij,Fij), each pair being associated with an antenna i. Among these pairs, there is a pair that includes a minimum power; the antenna associated with this minimum power is selected by the system as optimum antenna. The unique identifier of the selected optimum antenna is written in the tool entry of the j-th tool, as well as the Pij value and the Fij value determined for this optimum antenna.

The calibration step can for example be performed only once within a period of time, for instance once a day or once a week.

Once the calibration step is completed, the method described in section 3/ is performed whenever a drawer 36 is closed, to check whether a tool is present in the roller cabinet or not.

If the system concludes that a given tool is present in a drawer that has just been closed, the calibration step is not performed. This is advantageous because the calibration is time consuming.

The system may sometimes fail to properly detect a tool put back in its reference drawer because of the local environment of this tool. For instance, an optimum antenna 1 may fail to receive a response signal sent by the tool because of some obstacle (like another tool) that was not present in the reference drawer when the calibration step was performed but that is now present in the reference drawer.

To avoid such a misdetection, if the system concludes that a given tool is not present in its reference drawer, the system advantageously attempts to update the optimum frequency and the optimum frequency stored in the database in association with this tool and with the corresponding optimum antenna. During this update, the system tests different frequency values and/or power values like during the calibration step. However, the number of frequencies tested and/or the number of power values tested during the update step is preferably smaller than during the calibration step, to make this update shorter than the calibration step.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the system, device, apparatus and/or methods described herein may be combined in any combination, except mutually exclusive combinations. The implementations described herein can include various combinations and/or sub-combinations of the functions, components and/or features of the different implementations described.

What is claimed is:

1. A device for identifying or tracking tools, the device comprising:
   a first metallic wall delimiting a first area wherein a first tool including an RFID tag can be placed; and
   a first antenna for communicating with the RFID tag whenever the first tool is in the first area, characterized in that the first antenna is a slot antenna cut out in the first metallic wall;
   further comprising:
   a first control unit (22, 24) configured to set the first antenna (1) with a first frequency value and a first power value fulfilling the following criteria;
   the first frequency value is selected in a predetermined range of RFID frequencies and maximizes the power of a response signal emitted by the RFID tag in response to a request signal emitted by the first antenna (1),
   the first power value is a minimum value enabling the first antenna (1) configured with the selected frequency value to effectively detect the response signal such that an information about the first tool can be extracted therefrom; and
   wherein the first control unit (22, 24) is configured to perform the following steps:
   at a first time at which the first tool is in the first area, determining the first frequency value and the first power value by testing different values in the predetermined range of RFID frequencies and different values in a power range,
   at a second time after the first time, setting the first antenna with the first frequency value and the first power value determined at the first time, attempting to extract the information about the first tool from the first radio signal, and repeating the determination step only if the attempt fails.

2. The device of the claim 1, further comprising:
   a first analog-to-digital converter ADC, for converting an analog signal acquired by the first antenna into a first digital signal;
   a first processing unit for processing the digital signal; and
   a digital link (10) for transmitting the digital signal to the first processing unit.

3. The device of claim 2, wherein the first metallic wall and/or the first ADC is mobile relative to the first processing unit.

4. The device of claim 3, further comprising a first drawer comprising the first metallic wall, the first metallic wall being for instance a bottom wall of the first drawer on which the first tool can rest.

5. The device of claim 4, wherein the first position is a closed position of the first drawer and wherein the second position is an opened position of the drawer.

6. The device of claim 5, wherein the first analog-to-digital converter (ADC) is affixed to the first drawer, for instance to a back of the drawer.

7. The device of claim 6, further comprising:
   a second metallic wall delimiting a second area wherein a second tool including a RFID tag can be placed while the first tool is placed in the first area; and
   a second antenna for communicating with the RFID tag whenever second tool is in the second area, wherein the second antenna is a slot antenna cut out in the second metallic wall.

8. The device of claim 7, further comprising:
   a second analog-to-digital converter, ADC, for converting an analog signal acquired by the second antenna into a second digital signal;
   a second processing unit for processing the second digital signal; and
   a second digital link for transmitting the second digital sign: to the second processing unit.

9. The device of claim 7, wherein the second wall and/or the second ADC is mobile relative to the second processing unit.

10. The device of claim 9, wherein the second ADC can be put into a third position relative to the second processing unit, wherein the second ADC is connected to the second digital link to allow the second digital signal to be transmitted to the second processing unit, and
    a fourth position relative to the second processing unit, wherein the second ADC is disconnected from the second digital link to prevent a transmission of the second digital signal to the second processing unit.

11. The device of claim 10, wherein the third position is a closed position of a second drawer, and wherein the fourth position is an opened position of the second drawer.

12. The device of claim 11, wherein the first analog-to-digital converter (ADC) is affixed to the first drawer.

13. The device of claim 7, further comprising: a second drawer different from the first drawer, wherein the second drawer comprises the second metallic wall, the second metallic wall being for instance a bottom wall of the second drawer on which the second tool can rest.

14. The device of claim 7, further comprising:
    a second control unit configured to set the second antenna with a second frequency value and a second power value fulfilling the following criteria:
    wherein the second frequency value is selected in a predetermined range of RFID frequencies and maximizes the power of a response signal emitted by the RFID tag of the second tool in response to a request signal emitted by the second antenna; and wherein the second power value is a minimum value enabling the second antenna set with the selected frequency value to effectively detect the response signal such that an information about the second tool can be extracted therefrom.

15. The device of claim 14, wherein the second control unit is configured to perform the following steps:

at a third time at which the second tool is in the second area, determining the second frequency value and the second power value by testing different values in the predetermined range of RFID frequencies and different power values; and at a fourth time after the first time, setting the second antenna with the second frequency value and the second power value determined at the third time, attempting to extract the information about the second tool from the second radio signal, and repeating the determination step only if the attempt fails.

16. The device of claim 2, wherein the first ADC can be put into:

a first position relative to the first processing unit, wherein the first ADC is connected to the digital link to allow the digital signal to be transmitted to the first processing unit; and a second position relative to the first processing unit, wherein the first ADC is disconnected from the digital link to prevent a transmission of the digital signal to the first processing unit.

17. A roller cabinet comprising the device for identifying or tracking tools of claim 16.

* * * * *